United States Patent Office 2,734,900
Patented Feb. 14, 1956

2,734,900

SENSITIZING DYES AND METHOD OF PREPARATION

Donald W. Heseltine, Rochester, N. Y., assignor to Eastman Kodak Company, Rochester, N. Y., a corporation of New Jersey No Drawing. Application December 28, 1953,
Serial No. 400,810

14 Claims. (Cl. 260—240.5)

This invention relates to photographic sensitizing dyes and a method of preparing them.

In my copending application Serial No. 400,809, filed on even date herewith, there is described a method of preparing new quaternary salts. These quaternary salts can be represented by the following two general formulas:

I.

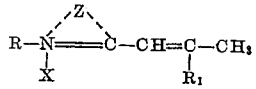

and

II.

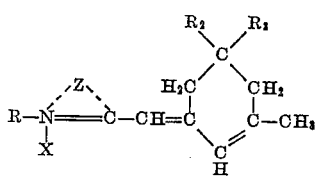

wherein R represents an alkyl group, such as methyl, ethyl, n-propyl, isopropyl, n-butyl, isobutyl, β-hydroxyethyl, carboxymethyl, carbethoxymethyl, β-methoxyethyl, benzyl (phenylmethyl), allyl (vinylmethyl), etc., $R_1$ represents a carbocyclic aromatic group, such as phenyl, o-, m-, and p-tolyl, o-, m-, and p-chlorophenyl, o-, m-, and p-hydroxyphenyl, o-, m- and p-methoxyphenyl, α-naphthyl, β-naphthyl, 2,5-dimethylphenyl, p-dimethylaminophenyl, p-diethylaminophenyl, 9-phenanthryl, etc., or a heterocyclic radical, such as 2-thienyl, etc., $R_2$ represents a hydrogen atom or a methyl group, $R_3$ represents a hydrogen atom, an alkyl group, such as methyl, ethyl, n-propyl, isopropyl, n-butyl, isobutyl, benzyl (phenylmethyl), etc., a monocyclic aryl group, such as phenyl, o-, m-, and p-tolyl, p-methoxyphenyl, etc., or a furyl group, X represents an anion, such as chloride, bromide, iodide, perchlorate, thiocyanate, acetate, methylsulfate, ethylsulfate, benzenesulfonate, toluenesulfonate, etc., and Z represents the non-metallic atoms necessary to complete a heterocyclic nucleus containing five atoms in the heterocyclic ring, such as those selected from the group consisting of those of the thiazole series (e. g. thiazole, 4-methylthiazole, 5-methylthiazole, 4-phenylthiazole, 5-phenylthiazole, 4,5-dimethylthiazole, 4,5-diphenylthiazole, 4-(2-thienyl)-thiazole, etc.), those of the benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e. g. α-naphthothiazole (i. e. [2,1]-naphthothiazole, β-naphthothiazole (i. e. [1,2]-naphthothiazole), 5-methoxy-β-naphthothiazole, 5-ethoxy-β-naphthothiazole, 7-methoxy-α-naphthothiazole, 8-methoxy-α-naphthothiazole, etc.), those of the benzoxazole series (e. g. benzoxazole, 5-chlorobenzoxazole, 5-phenylbenzoxazole, 5-methylbenzoxazole, 6-methylbenzoxazole, 5,6-dimethylbenzoxazole, 4,6-dimethylbenzoxazole, 5-methoxybenzoxazole, 6-methoxybenzoxazole, 5-ethoxybenzoxazole, 6-chlorobenzoxazole, 5-hydroxybenzoxazole, 6-hydroxybenzoxazole, etc.), those of the naphthoxazole series (e. g. α-naphthoxazole, β-naphthoxazole, etc.), those of the benzoselenazole series (e. g. benzoselenazole, 5-chlorobenzoselenazole, 5-methoxybenzoselenazole, 5-hydroxybenzoselenazole, tetrahydrobenzoselenazole, etc.), those of the naphthoselenazole series (e. g. α-naphthoselenazole, β-naphthoselenazole, etc.), those of the thiazoline series (e. g. thiazoline, 4-methylthiazoline, etc.). British Patent 625,907, accepted July 6, 1949, describes a method for making certain heterocyclic quaternary salts embraced by Formula I above. Also described in the British patent is a method of preparing photographic sensitizing dyes from these intermediates. However, the intermediates obtained according to the process described in my copending application Serial No. 400,809, are substantially pure and yield photographic sensitizing dyes which are likewise pure. Contrasted with the pure intermediates of my copending application, the intermediates obtained according to British Patent 625,907 are evidently contaminated with a material which interferes with certain dye condensations. For example, the intermediates described in the British patent cannot be condensed with so-called ICI intermediates to produce dicarbocyanine dyes which can be isolated from the reaction mixture.

Accordingly, it is an object of my invention to provide a method for obtaining photographic sensitizing dyes from the intermediates represented by Formulas I and II above. Another object of my invention is to provide new photographic sensitizing dyes. A further object of my invention is to provide photographic sensitizing dyes which can be separated from their reaction medium in substantially pure form. Still another object of my invention is to provide photographic silver halide emulsions sensitized with optical sensitizing dyes obtained according to my new process. Other objects will become apparent from a consideration of the following description and examples.

According to my invention, I realize the above objects by condensing together a compound selected from those represented by Formulas I and II above with a compound selected from those represented by the following general formula:

III.

$$R_4-N(=CH-CH)_{n-1}=C(-CH=CH)_d-N-R_6$$
$$\phantom{R_4-N}\vert\phantom{(=CH-CH)_{n-1}=C(-CH=CH)_d-N}\vert$$
$$\phantom{R_4-N}X_1\phantom{(=CH-CH)_{n-1}=C(-CH=CH)_d-N}R_5$$

wherein $R_4$ represents an alkyl group, such as methyl, ethyl, n-propyl, n-butyl, β-hydroxyethyl, β-methoxyethyl, carbethoxymethyl, benzyl (phenylmethyl), etc., (e. g. an alkyl group of the formula $C_mH_{2m+1}$ wherein $m$ is a positive integer of from 1 to 4), $R_5$ represents a carboxylic acyl group, such as acetyl, propionyl, benzoyl, etc., $R_6$ represents a mononuclear aromatic group of the benzene series, such as phenyl, o-, m-, and p-tolyl, etc., $X_1$ represents an acid radical, such as chloride, bromide, iodide, thiocyanate, perchlorate, benzenesulfonate, p-toluenesulfonate, methylsulfate, ethylsulfate, etc., $d$ represents a positive integer of from 1 to 3, $n$ represents a positive integer of from 1 to 2, and $Z_1$ represents the non-metallic atoms necessary to complete a heterocyclic nucleus containing from five to six atoms in the heterocyclic ring, such as those selected from the group consisting of those of the thiazole series (e. g. thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.), those of the benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e. g. α-naphthothiazole, β-naphthothiazole, 5-methoxy-β-naphthothiazole, 5-ethoxy-β-naphthothiazole, 8-methoxy-α-naphthothiazole, 7-methoxy-α-naphthothiazole, etc.), those of the thianaphtheno-7′,6′,4,5-thiazole series (e. g. 4′-methoxythianaphtheno-7′,6′,4,5-thiazole, etc.), those of the oxazole series (e. g. 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e. g. benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), those of the naphthoxazole series (e. g. α-naphthoxazole, β-naphthoxazole, etc.), those of the selenazole series (e. g. 4-methylselenazole, 4-phenylselenazole, etc.), those of the benzoselenazole series (e. g. benzoselenazole, 5-chlorobenzoselenazole, 5-methoxybenzoselenazole, 5-hydroxybenzoselenazole, tetrahydrobenzoselenazole, etc.), those of the naphthoselenazole series (e. g. α-naphthoselenazole, β-naphthoselenazole, etc.), those of the thiazoline series (e. g. thiazoline, 4-methylthiazoline, etc.), those of the 2-quinoline series (e. g. quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e. g. quinoline, 6-methoxyquinoline, 7-methylquinoline, 8-methylquinoline, etc.), those of the 1-isoquinoline series (e. g. isoquinoline, 3,4-dihydroisoquinoline, etc.), those of the 3-isoquinoline series (e. g. isoquinoline, etc.), those of the benzimidazole series (e. g. 1,3-diethylbenzimidazole, 1-ethyl-3-phenylbenzimidazole, etc.), those of the 3,3-dialkylindolenine series (e. g. 3,3-dimethylindolenine, 3,3,5-trimethylindolenine, 3,3,7-trimethylindolenine, etc.), the pyridine series (e. g. pyridine, 5-methylpyridine, etc.), etc.

The photographic sensitizing dyes obtained by condensing the compounds of Formula I or II with a compound selected from those represented by Formula III can be represented by the following two general formulas:

IV.
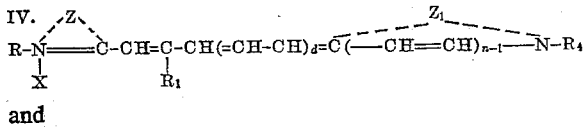

and

V.
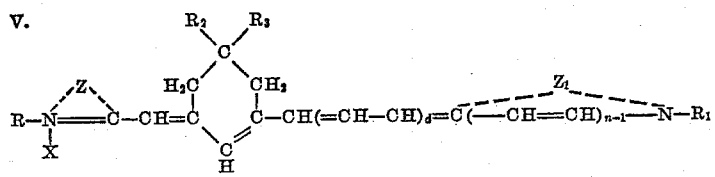

wherein R, R₁, R₂, R₃, R₄, X, d, n, Z and Z₁ each have the values given above. The sensitizing dyes represented by Formula V are new while certain of the compounds represented by Formula IV are also new.

I have also found that new sensitizing dyes can be advantageously prepared by condensing a compound selected from those represented by Formula I or II with a compound selected from those represented by the following general formula:

VI.
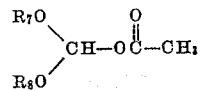

wherein R₇ and R₈ each represent an alkyl group, such as methyl, ethyl, n-propyl, etc. Alternatively, the vinylogous analogues of certain of these sensitizing dyes can be obtained by condensing a compound selected from those represented by Formula I with a compound selected from those represented by the formula:

VIa.   R″O—CH=CH—CH(OR′)₂ wherein R′ and R″ each represents an alkyl group, such as methyl, ethyl, etc.

The products obtained by the condensation of the compounds represented by Formula I with those of Formula VI or VIa can advantageously be represented by the following general formula:

VII.
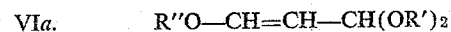

wherein R, R₁, X and Z each have the values given above, and $m$ represents a positive integer of from 1 to 2.

The sensitizing dyes produced by the condensation of the compounds of Formula II with those of Formula VI can advantageously be represented by the following general formula:

VIII.
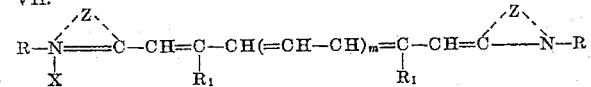

wherein, R, R₂, R₃, X and Z each have the values given above.

I have also found that new sensitizing dyes can be obtained by condensing a compound selected from those represented by Formula I or II with a compound selected from those represented by the following general formula:

IX.
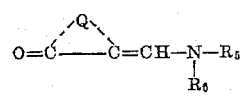

wherein R₅ and R₆ each have the values given above and Q represents the non-metallic atoms necessary to complete a heterocyclic nucleus containing from 5 to 6 atoms in the heterocyclic ring, such as those selected from the group consisting of those of the thiazolinone series, for example: those of the 2,4-thiazolidinedione series, such as 2,4-thiazolidinedione, 3-alkyl-2,4-thiazolidinediones (e. g. 3-ethyl-2,4-thiazolidinedione, etc.), 3-phenyl-2,4-thiazolidinedione, 3-α-naphthyl-2,4-thiazolidinedione, etc., those of the 2-thio-2,4-thiazolidinedione (rhodanine) series, such as 3-alkyl-2-thio-2,4-thiazolidinediones (3-alkylrhodanines) (e. g. 3-ethyl-2-thio-2,4-thiazolidinedione), 3-phenyl-2-thio-2,4-thiazolidinedione, 3-α-naphthyl-2-thio-2,4-thiazolidinedione, 3-(1-benzothiazyl)-2-thio-2,4-thiazolidinedione, etc., those of the 2-thio-2,5-thiazolidinedione series (e. g. 3-ethyl-2-thio-2,5-thiazolidinedione, etc.), etc., those of the 2-alkylmercapto-2-thiazolin-4-one series, such as 2-ethylmercapto-2-thiazolin-4-one, etc., those of the thiazolidinone series, such as 4-thiazolidinone or its 3-alkyl (e. g. 3-ethyl, etc.), 3-phenyl or 3-α-naphthyl derivatives, those of the 2-alkylphenylamino-2-thiazolin-4-one series (e. g. 3-ethylphenylamino-2-thiazolin-4-one, etc.), those of the 2-diarylamino-2-thiazolin-4-one series (e. g., 2-diphenylamino-2-thiazolin-4-one, etc.), those of the 2-thiazolin-5-one series, such as 2-ethylthio-2-thiazolin-5-one, 2-benzylthio-2-thiazolin-5-one, etc.; those of the oxazolone series, for example: those of the 2-thio-2,4-oxazolidinedione series, such as 3-alkyl (e. g. 3-methyl, 3-ethyl, etc.)-2-thio-2,4-oxazolidinediones, those of the 2-imino-2,4-oxazolidinedione (pseudohydantoin) series, etc., those of the 2-oxazolin-5-one series such as 2-phenyl-2-oxazolin-5-one, 2-ethyl-2-oxazolin-5-one, etc., those of the 2-isoxazolin-5-one series, such as 3-phenyl-2-isoxazolin-5-one, etc., those of the imidazolidinone series, for example: those of the 2,4-imidazolidinedione (hydantoin) or its 3-alkyl (e. g. 3-ethyl, etc.), 3-phenyl or 3-α-naphthyl derivatives, as well as its 1,3-dialkyl (e. g. 1,3-diethyl, etc.), 1-alkyl-3-phenyl (e. g. 1-ethyl-3-phenyl, etc.), 1-alkyl-3-naphthyl (e. g. 1-ethyl-3-α-naphthyl, etc.), 1,3-diphenyl, etc. derivatives, those of the 2-thio-2,4-imidazolidinedione series, such as 2-thio-2,4-imidazolidinedione (2-thiohydantoin) or its 3-alkyl (e. g. 3-methyl, 3-ethyl, etc.), 3-phenyl or 3-α-naphthyl derivatives, as well as its 1,3-dialkyl (e. g. 1,3-diethyl, etc.), 1-alkyl-3-phenyl (e. g. 1-ethyl-3-phenyl, etc.), 1-alkyl-3-naphthyl (e. g. 1-ethyl-3-α-naphthyl, etc.), 1,3-diphenyl, etc. derivatives, those of the 2-alkylmercapto-2-imidazolin-5-one series, such as 2-n-propylmercapto-2-imidazolin-5-one; those of the thianaphthenone series, such as 3(2H)-thianaphthenone or 2(3H)-thianaphthenone; those of the pyrazolone series, such as pyrazolone or its 1-alkyl (e. g. 1-methyl, 1-ethyl, etc.), 1-phenyl, 1-naphthyl (e. g. 1-α-naphthyl), 3-alkyl (e. g. methyl, ethyl, etc.), 3-phenyl, 3-naphthyl (3-α-naphthyl), 1-alkyl-3-phenyl (e. g. 1-methyl-3-phenyl, etc.), 3-alkyl-1-phenyl (e. g. 3-methyl-1-phenyl, etc.), 1,3-dialkyl (e. g. 1,3-dimethyl, etc.), 1,3-diphenyl, etc. derivatives; those of the oxindole series, such as 2,3-dihydro-3-ketoindole, and like five-membered heterocyclic nuclei; those of the 2,4,6-triketohexahydropyrimidine series, for example, 2,4,6-triketohexahydropyrimidine (barbituric acid), 2-thio-2,4,6-triketohexahydropyrimidine (2-thiobarbituric acid) as well as their 1-alkyl (e. g. 1-ethyl, etc.) or 1,3-dialkyl (1,3-diethyl, etc.) derivatives; those of the 3,4-dihydro-2(1H)-quinolone series, such as 3,4-dihydro-2(1H)-quinolone (dihydrocarbostyril); those of the 3,4-dihydro-2(1H)-quinoxalone series, such as 3,4-dihydro-2(1H)-quinoxalone (oxydihydroquinoxaline), etc.; those of the 3-phenomorpholone (1,4,2H-benzoxazine-3(4H)-one or benzo-β-morpholone) series, such as 3-phenomorpholone, etc.; those of the 1,4,2H-benzothiazine-3(4H)-one (ketodihydrobenzoparathiazine) series, such as ketodihydrobenzoparathiazine, etc., and like six-membered heterocyclic nuclei.

The new sensitizing dyes obtained by condensing the compounds of Formula I or II with those of Formula IX can advantageously be represented by the following general formulas:

X.

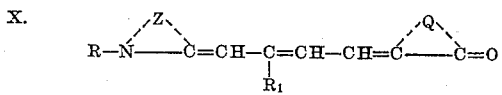

and

XI.

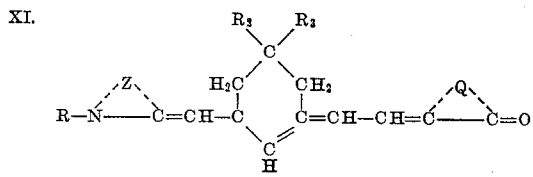

wherein R, $R_1$, $R_2$, $R_3$, Q and Z each have the values given above.

Alternatively, the compounds of Formula V above wherein $d$ is 2 can be prepared by condensing a compound selected from those represented by the following general formula:

XII.

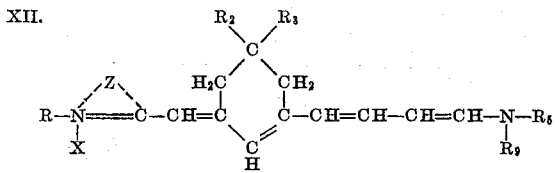

wherein R, $R_2$, $R_3$, $R_5$, X and Z each have the values given above, and $R_9$ represents a monocyclic aromatic group, such as phenyl, tolyl, etc., with a compound selected from those represented by the following general formula:

XIII.

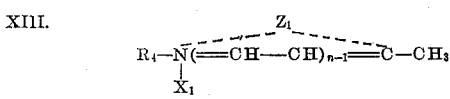

wherein $R_4$, $X_1$, $n$ and $Z_1$ each have the values given above. The compounds selected from those represented by Formula XII above can be prepared by heating together in the presence of a carboxylic anhydride a compound selected from those represented by Formula II with a compound selected from those represented by the following general formula:

VIb.    $R_9$—NH—CH=CH—CH=N—$R_{10}$ wherein $R_9$ has the values given above and $R_{10}$ represents an aryl group, such as phenyl, o-, m-, and p-tolyl, etc.

The condensation of the compounds represented by Formulas I and II with those represented by Formulas III, VI, VIa, VIb, and IX, or those of Formula XII with those of Formula XIII, can be accelerated by heating. The particular temperature used can be varied, depending on the boiling point of the reactants. Advantageously, these condensations can be carried out in the presence of an inert medium, such as pyridine, quinoline, 1,4-dioxane, etc. Except for the condensation of the compounds of Formula II with those of Formula VIb which is carried out in the presence of a carboxylic anhydride, such as acetic anhydride, propionic anhydride, butyric anhydride, benzoic anhydride, etc., the lower aliphatic alcohols have also been found to be effective diluents. Typical lower aliphatic alcohols include ethanol, n-propanol, n-butanol, isopropanol, isobutanol, etc.

The condensation of the compounds of Formula I or II with those represented by Formulas III or IX, or the condensation of the compounds of Formula XII with those of XIII can advantageously be carried out in the presence of a basic condensing agent. Typical agents include, for example, the trialkylamines (e. g. triethylamine, tri-n-propylamine, triisopropylamine, tri-n-butylamine, triisobutylamine, tri-n-amylamine, etc.), the N-alkylpiperidines (e. g. N-methylpiperidine, N-ethylpiperidine, etc.), the N,N-dialkylanilines (e. g. N,N-dimethylaniline, N,N-diethylaniline, etc.), etc.

The following examples will serve to illustrate more fully the manner whereby I practice my invention.

*Example 1.—3,3'-diethyl-9-(1-naphthyl)-thiadicarbocyanine iodide*

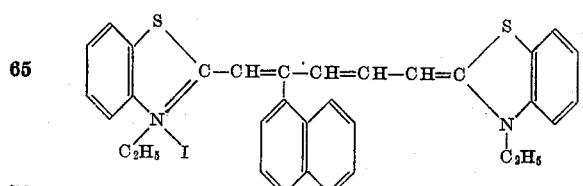

3-ethyl - 2 - (2-α-naphthylpropenyl)benzothiazolium iodide (1 mol., 0.76 g.), 2-β-acetanilidovinyl-3-ethylbenzothiazolium iodide (1 mol.+10%, 0.83 g.) and triethylamine (1 mol.+100%, 0.5 ml.) were dissolved in ethyl alcohol (10 ml.) heated under reflux for fifteen minutes.

The reaction mixture was then chilled overnight, filtered, and the crude dye was washed with water and ethyl alcohol and dried. After two recrystallizations from methyl alcohol, the yield of purified dye was 0.65 g. (61%), M. P. 240–241° C. dec.

*Example 2.—3,3'-diethyl-11-(1-naphthyl)-oxathiadicarbocyanine iodide*

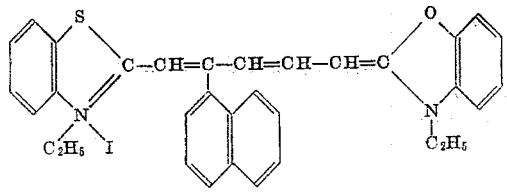

3-ethyl - 2 -(2-α-naphthylpropenyl)benzothiazolium iodide (1 mol., 0.76 g.), 2-β-acetanilidovinyl-3-ethylbenzoxazolium iodide (1 mol.+10%, 0.80 g.) and triethylamine (1 mol.+100%, 0.5 ml.) were dissolved in ethyl alcohol (10 ml.) and heated under reflux for fifteen minutes. The reaction mixture was then chilled overnight, filtered, and the crude dye washed with water and dried. After two recrystallizations from methyl alcohol, the yield of purified dye was 0.38 g. (37%), M. P. 204–205° C. dec.

*Anal.*—Calcd. for $C_{33}H_{29}IN_2OS$: I, 20.2. Found: I, 20.5.

*Example 3.—3,3'-diethyl-9,13-di(1-naphthyl)-thiatricarbocyanine iodide*

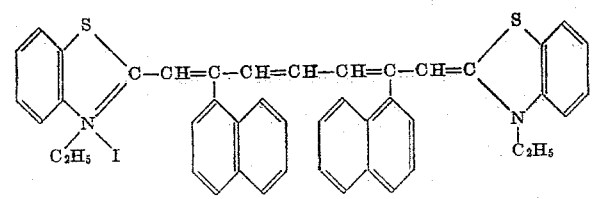

3-ethyl - 2 -(2-α-naphthylpropenyl)benzothiazolium iodide (1 mol., 1.52 g.), and diethoxymethyl acetate (1 mol.+200%, 1.62 g.) were dissolved in pyridine (10 ml.) and heated under reflux for three minutes. Water (2 ml.) was added with stirring to the hot reaction mixture and it was then chilled overnight. The crude dye was filtered off, washed thoroughly with water and ether and dried. After two recrystallizations from methyl alcohol, the yield of purified dye was 0.34 g. (27%), M. P. 223–224° C. dec.

*Example 4.—3,3'- diethyl - 9,15-di(1-naphthyl)-thiatetracarbocyanine iodide*

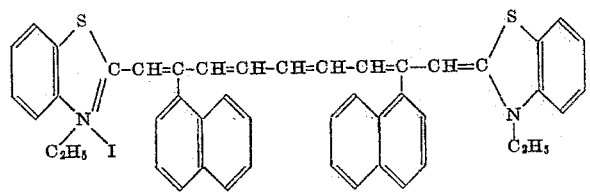

3-ethyl - 2 -(2-α-naphthylpropenyl)benzothiazolium iodide (1 mol., 1.52 g.) and 1,1,3-trimethoxypropene (1 mol.+100%, 1.3 g.) were dissolved in pyridine and then heated rapidly to reflux temperature. The reaction mixture was heated under reflux for sixty seconds and then the crude dye was immediately thrown out of solution by the addition of water (50 ml.). The crude dye was then filtered off and thoroughly washed with water, ether, and finally methyl alcohol. After two recrystallizations from acetone, the yield of purified dye was 0.23 g. (18%), M. P. 206–207° C. dec.

*Example 5.—3-ethyl-5-[4-(3-ethyl-2(3H)benzothiazolylidene)-3-(1-naphthyl-2-butenylidene]-rhodanine*

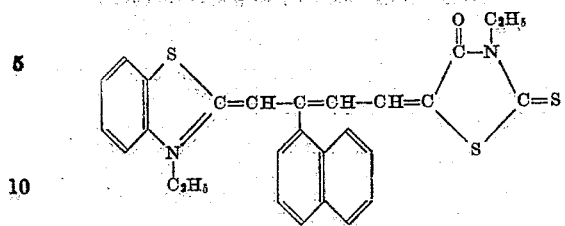

3 - ethyl - 2 - (2 - α - naphthylpropenyl)benzothiazolium iodide (1 mol., 0.76 g.), 5-acetanilidomethylene-3-ethyl-rhodanine (1 mol.+10%, 0.56 g.) and triethylamine (1 mol.+100%, 0.5 ml.) were dissolved in pyridine (10 ml.) and heated under reflux for fifteen minutes. Methyl alcohol (100 ml.) was added with stirring to the reaction mixture and it was then chilled overnight. The crude dye was filtered off, washed well with methyl alcohol and dried. After two recrystallizations from pyridine and methyl alcohol, the yield of purified dye was 0.63 g. (76%), M. P. 256–257° C. dec.

*Anal.*—Calcd. for $C_{28}H_{24}N_2OS_3$: C, 67.0; H, 4.8. Found: C, 66.6; H, 4.8.

*Example 6.—4-[4-(3-ethyl-2(3H)benzothiazolylidene)-3-(1 - naphthyl) - 2 - butenylidene] - 3 - methyl - 1 - phenylpyrazolone*

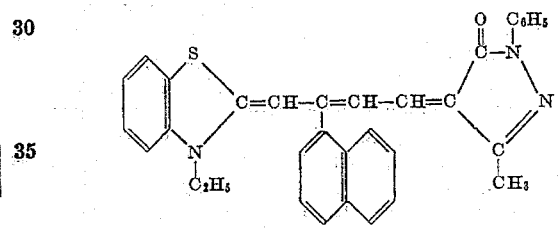

3 - ethyl - 2 - (2 - α - naphthylpropenyl)benzothiazolium iodide (1 mol., 0.76 g.), 4-acetanilidomethylene-3-methyl-1-phenylpyrazolone (1 mol.+10%, 0.58 g.) and triethylamine (1 mol.+100%, 0.5 ml.) were dissolved in pyridine (10 ml.) and heated under reflux for fifteen minutes. The reaction mixture was diluted with 200 ml. of aqueous methyl alcohol and chilled overnight. The crude product was filtered off, washed with water and dried. After two recrystallizations from ethyl alcohol, the yield of purified dye was 0.36 g. (43%), M. P. 258–259° C. dec.

*Example 7.—3, 3'-diethyl-9-phenylthiadicarbocyanine iodide*

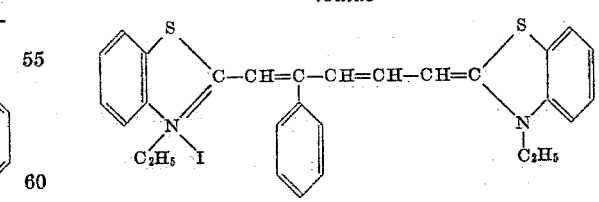

3 - ethyl - 2 - (2 - phenylpropenyl)benzothiazolium - p - toluenesulfonate (1 mol., 0.75 g.), 2-β-acetanilidovinyl-3-ethylbenzothiazolium iodide (1 mol., 0.75 g.) and triethylamine (2 mols., 0.5 cc.) were dissolved in ethyl alcohol (10 ml.) and heated under reflux for fifteen minutes. The crude dye was then thrown out of solution by the addition of water (50 ml.), the aqueous solution decanted and the dye dissolved in acetone (15 ml.). The dye was twice more thrown out of solution with water and dissolved in hot acetone. The final acetone solution was chilled overnight and the crystalline dye filtered off and dried. After two recrystallizations from acetone, the yield of purified dye was 0.41 g. (42%), M. P. 195–196° C. dec.

*Example 8.—3, 3'-diethyl-9, 13-diphenylthiatricarbocyanine iodide*

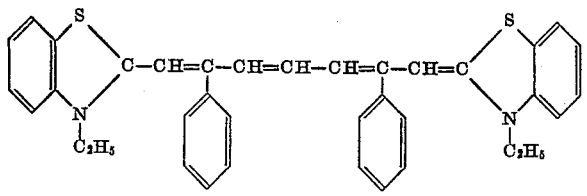

3 - ethyl - 2 - (2 - phenyl)propenylbenzothiazolium - p - toluenesulfonate (1 mol., 1.50 g.) and diethoxymethyl acetate (1 mol.+500%, 1.62 g.) were dissolved in pyridine (10 ml.) and heated rapidly to boiling. The reaction mixture was heated under reflux for two minutes. The crude dye was converted to the iodide by the addition of sodium iodide (1 g. in 10 ml. water). After chilling overnight, the crude dye was filtered off, washed with water and ether and dried. After two recrystallizations from methyl alcohol, the yield of purified dye was 0.29 g. (25%), M. P. 202–203° C. dec.

*Anal.*—Calcd. for $C_{37}H_{33}IN_2S_2$: I, 18.23; Found: I, 18.3.

*Example 9.—3-ethyl-5-[4-(3-ethyl-2(3H)benzothiazolylidene)-3-phenyl-2-butenylidene]-1-rhodanine*

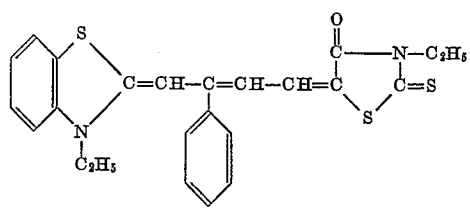

3 - ethyl - 2 - (2 - phenyl)propenylbenzothiazolium - p - toluenesulfonate (1 mol., 1.13 g.), 5-acetanilidomethylene-3-ethylrhodanine (1 mol.+10%, 0.84 g.) and triethylamine (2 mols., 0.5 cc.) were dissolved in pyridine (10 ml.) and heated under reflux for ten minutes. Methyl alcohol (100 ml.) was added to the reaction mixture with stirring and it was then chilled overnight. The crude dye was filtered off, washed with methyl alcohol and dried. After two recrystallizations from pyridine and methyl alcohol, the yield of purified dye was 0.75 g. (68%), M. P. 189–190° C. dec.

*Anal.*—Calcd. for $C_{24}H_{22}N_2OS_3$: C, 63.96; H, 4.92. Found: C, 63.9; H, 4.9.

*Example 10.—3, 3'diethyl-9, 11-neopentylene-thiadicarbocyanine iodide*

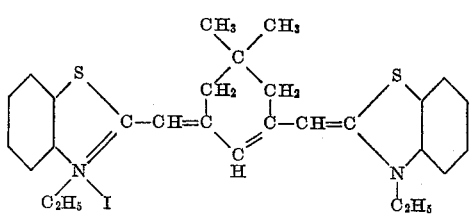

3 - ethyl - 2 - (1, 5, 5 - trimethyl - 3 - cyclohexenylidene)methylbenzothiazolium iodide (1 mol., 0.85 g.), 3-ethyl-2-ethylmercaptobenzothiazolium ethyl sulfate (1 mol.+100%, 1.40 g.), and triethylamine (1 mol.+100%, 0.5 ml.) were dissolved in pyridine (10 ml.) and heated under reflux for fifteen minutes. The reaction mixture was chilled and stirred with water (50 ml.) and ether (100 ml.) and then chilled overnight. The crude dye was filtered off, washed with water and ether and dried. After two recrystallizations from methyl alcohol, the yield of purified dye was 0.55 g. (47%), M. P. 215–216° C. dec.

*Example 11.—3, 3'-diethyl-11, 13-neopentylene-oxa-thiatricarbocyanine iodide*

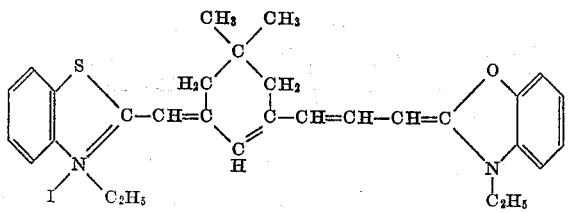

3 - ethyl - 2 - (1, 5, 5 - trimethyl - 3 - cyclohexenylidene)methylbenzothiazolium iodide (1 mol., 0.85 g.), 2-β-acetanilidovinyl-3-ethylbenzoxazolium iodide (1 mol., 0.87 g.) and triethylamine (2 mols., 0.5 ml.) were dissolved in pyridine (10 ml.) and heated under reflux for five minutes. The reaction mixture was cooled, stirred with water (50 ml.) and ether (100 ml.) until the dye started to crystallize and was then chilled overnight. The crude dye was filtered off, washed with water and ether and dried. After two recrystallizations from methyl alcohol, the yield of purified dye was 0.21 g. (18%), M. P. 223–224° C. dec.

*Example 12.—3, 3'-diethyl-9, 11-neopentylene-thiatricarbocyanine iodide*

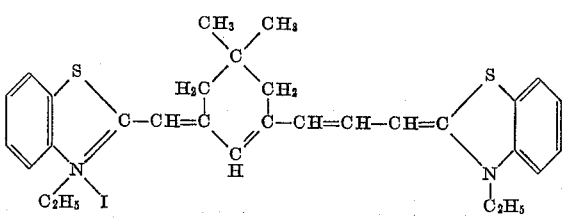

3-ethyl-2-(1, 5, 5-trimethyl-3-cyclohexenylidene)methylbenzothiazolium iodide (1 mol., 0.85 g.), 2-β-acetanilidovinyl-3-ethylbenzothiazolium iodide (1 mol., 0.90 g.) and triethylamine (2 mols., 0.5 ml.) were dissolved in pyridine (10 ml.) and heated under reflux for five minutes. The reaction mixture was then cooled and water (50 ml.) and ether (100 ml.) added with stirring and the reaction mixture chilled overnight. The crude dye was filtered off, washed with water and ether and dried. After two recrystallizations from methyl alcohol, the yield of purified dye was 0.88 g. (72%), M. P. 219–220° C. dec.

*Example 13.—3, 3'-diethyl-9, 11-neopentylene-thiatetracarbocyanine iodide*

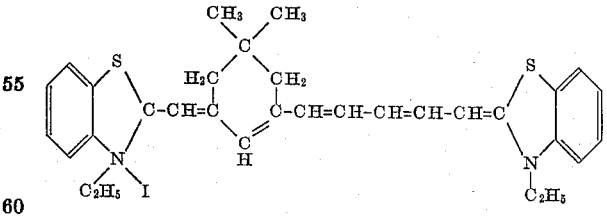

3-ethyl-2-(1,5,5-trimethyl-3-cyclohexenylidene)methylbenzothiazolium iodide (1 mol., 0.85 g.), 2-(4-anilinobutadienyl)-3-ethylbenzothiazolium iodide (1 mol., 0.87 g.) triethylamine (2 mols., 0.5 ml.) and acetic anhydride (1 mol., 0.21 ml.) were dissolved in ethyl alcohol and heated under reflux for five minutes. The crude dye was thrown out of solution by the addition of water (50 ml.) and ether (200 ml.) and the mixture was chilled overnight. The water and ether solutions were decanted and the crude dye stirred with ethyl alcohol (50 ml.) until crystallization started. The mixture was then heated to boiling and chilled overnight. The crude dye was filtered off, washed with water and ether and dried. After two recrystallizations from ethyl alcohol, the yield of purified dye was 0.51 g. (40%), M. P. 198–199° C. dec.

Example 14.—3,3'-diethyl-9,11-neopentylene-thiapentacarbocyanine iodide

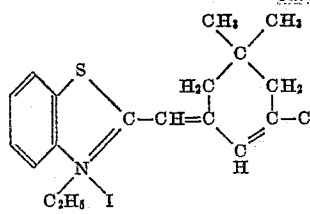 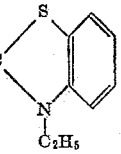

3-ethyl-2-(1,5,5-trimethyl-3-cyclohexenylidene)methylbenzothiazolium iodide (2 mols., 1.70 g.), 2-(6-acetanilidohexatrienyl)-3-ethylbenzothiazolium-p-toluenesulfonate (1 mol., 1.0 g.) and triethylamine (2 mols., 0.5 ml.) were dissolved in ethyl alcohol (20 ml.) and rapidly heated to the reflux temperature. Refluxing was continued for two minutes and then the reaction mixture was allowed to cool slowly to room temperature. After chilling for two hours, the crude dye was filtered off, washed with water and ether and dried. After two recrystallizations from methyl alcohol, the yield of purified dye was 0.15 g. (11%), M. P. 195–196° C. dec.

Example 15.—1-ethyl-5-[6-(3-ethyl-2(3H)benzothiazolylidene-3,5-neopentylene-2,4-hexadienylidene]-2-thiobarbituric acid

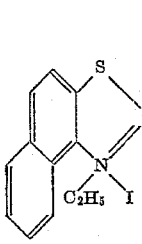

3-ethyl-2-(1,5,5-trimethyl-3-cyclohexenylidene)methylbenzothiazolium iodide (1 mol., 0.85 g.), 1-ethyl-2-thiobarbituric acid (1 mol.+20%, 0.41 g.), diethoxymethyl acetate (1 mol.+50%, 0.5 ml.) and triethylamine (2 mols. 0.5 ml.) were dissolved in pyridine (10 ml.) and heated under reflux for five minutes. At this time an additional 0.5 ml. of diethoxymethyl acetate and 0.5 ml. of triethylamine were added and refluxing was continued for an additional five minutes. Then 100 ml. of 50% aqueous methyl alcohol was added with stirring and the reaction mixture was chilled overnight. The crude dye was filtered off, washed with methyl alcohol and dried. After two recrystallizations from pyridine and methyl alcohol, the yield of purified dye was 0.30 g. (31%), M. P. 275–276° C. dec.

Example 16.—3,3'-diethyl-9,11; 15,17-dineopentylene-thia-pentacarbocyanine iodide

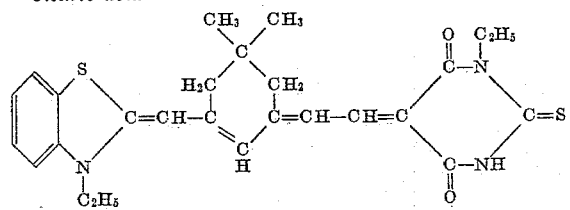

3-ethyl-2-(1,5,5-trimethyl-3-cyclohexenylidene)methylbenzothiazolium iodide (1 mol., 4.25 g.) was dissolved in pyridine (25 ml.) and the mixture heated to reflux temperature. The reaction was removed from the heat and diethoxymethyl acetate (1 mol.+300%, 3.2 g.) and triethylamine (1 mol.+100%, 1.4 ml.) were added in that order. The reaction mixture was allowed to cool slowly in the dark for one hour, and was then poured into a beaker and water (100 ml.) and ether (100 ml.) were added with stirring. The stirring was continued until crystallization started and the mixture was then chilled for one hour. The crude dye was filtered off, washed with water and ether and boiled with methyl alcohol, chilled overnight, filtered and dried. After two recrystallizations from methyl alcohol, the yield of purified dye was 0.17 g. (5%), M. P. 203–4° C. dec.

Example 17.—3,3'-diethyl-9,11-neopentylene-4,5-benzothiapentacarbocyanine iodide

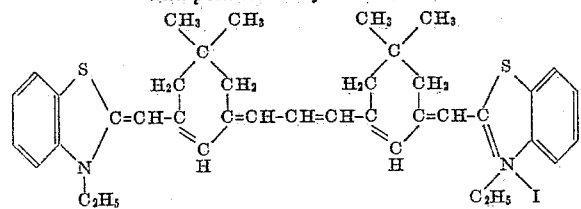

1-ethyl-2-(1,5,5-trimethyl-3-cyclohexenylidene)methylnaphtho[1,2]thiazolium iodide (1.90 g., 1 mol.), 2-(6-acetanilidohexatrienyl)-3-ethylbenzothiazolium p-toluenesulfonate (2.17 g., 1 mol.) and triethylamine (1.4 ml., 1 mol.+150%) were dissolved in ethyl alcohol (25 ml.) and heated to reflux. The reaction mixture was allowed to stand for two hours without further heating and was then chilled overnight. The crude dye was filtered off, washed with water and ether, and dried. The dye was stirred with boiling methyl alcohol (100 ml.), chilled, filtered, and dried. The yield of pentacarbocyanine iodide was 0.23 g. (8%). M. P. 194–5° C. dec.

Example 18.—3,3'-diethyl-9,11-neopentylene-selenatricarbocyanine iodide

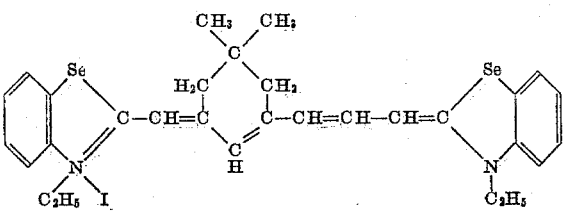

3-ethyl-2-(1,5,5-trimethyl-3-cyclohexenylidene)methylbenzoselenazolium iodide (1.18 g., 1 mol.), 2-β-acetanilidovinyl-3-ethylbenzoselenazolium iodide (1.24 g., 1 mol.) and triethylamine (0.7 ml., 1 mol.+100%) were dissolved in ethyl alcohol (15 ml.) and heated under reflux for fifteen minutes. The crude dye was thrown out of solution by the addition with stirring of water (100 ml.) and ether (100 ml.). The product was then filtered off, washed with water and ether, and dried. After two recrystallizations from methyl alcohol, the yield of pure dye was 0.68 g. (39%). M. P. 207–8° C. dec.

*Example 19.—5,5'-dichloro-3,3'-diethyl-9,11; 15,17-dineopentylenethiapentacarbocyanine iodide*

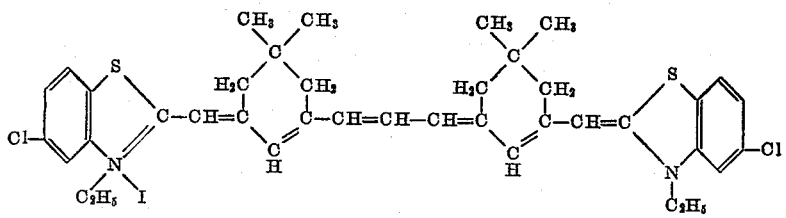

5 - chloro - 3 - ethyl - 2 - (1,5,5 - trimethyl - 3 - cyclohexenylidene)methylbenzothiazolium iodide (2.51 g., 1 mol.) and diethoxymethyl acetate (1.62 g., 1 mol. + 300%) were dissolved in pyridine (15 ml.) and the reaction mixture heated rapidly to boiling. The reaction mixture was then allowed to cool slowly to room temperature, and the crude dye was thrown out of solution by the addition with stirring of water (100 ml.) and ether (100 ml.). The water and ether were then decanted and the residue stirred with acetone until crystalline, chilled, filtered, and the crude product dried. After two recrystallizations from methyl alcohol, the yield of pure dye was 0.10 g. (5%). M. P. 205–6° C. dec.

methylbenzothiazolium iodide (0.41 g., 1 mol.), 2-β-anilinobutadienyl-3-ethylbenzothiazolium iodide (0.43 g., 1 mol.), acetic anhydride (0.11 ml. 1 mol.), and triethylamine (0.28 ml., 1 mol. + 100%) were dissolved in ethyl alcohol (10 ml.) and heated under reflux for twenty minutes. The crude dye was thrown out of solution by the addition of water (100 ml.) and ether (100 ml.). The crude dye was filtered off and then stirred with a little methyl alcohol until crystalline, chilled, filtered, and dried. After two recrystallizations from methyl alcohol, the yield of pure dye was 0.10 g. (16%). M. P. 203–4° C. dec.

*Example 20.—3,3'-diethyl-9,11-neopentylene-6,7;6',7'-dibenzothiatetracarbocyanine iodide*

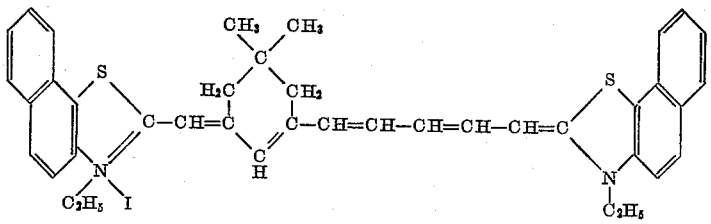

1 - ethyl - 2 - (1,5,5 - trimethylcyclohexenylidene)-methylnaphtho[2,1]thiazolium iodide (2.39 g., 1 mol.), anilinoacrolein anil hydrochloride (2.58 g., 1 mol. + 100%) and acetic anhydride (20 ml.) were mixed and heated under reflux for thirty minutes. The reaction mixture was chilled, filtered, and the solid was suspended in ethyl alcohol (40 ml.). 1-ethyl-2-methylnaphtho[2,1]thiazolium iodide (1.8 g., 1 mol.) and triethylamine (1.4 ml., 1 mol. + 100%) were added, and the reaction mixture refluxed for forty minutes. The reaction mixture was filtered hot, and the filtrate chilled overnight. The crude dye (0.5 g., 13%) was filtered off, washed with a little methyl alcohol and dried. After recrystallization from ethyl alcohol, the yield of pure dye was 0.30 g. (8%), M. P. 201–2° C. dec.

*Example 21.—3,3'-diethyl-9,11-(2-methyltrimethylene)-thiatetracarbocyanine iodide*

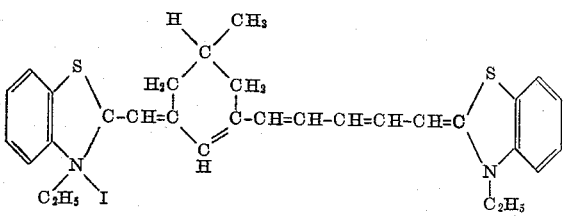

3 - ethyl - 2 - (1,5 - dimethyl - 3 - cyclohexenylidene)-

*Example 22.—3,3'-diethyl-9,11-neopentylene-oxa-tricarbocyanine iodide*

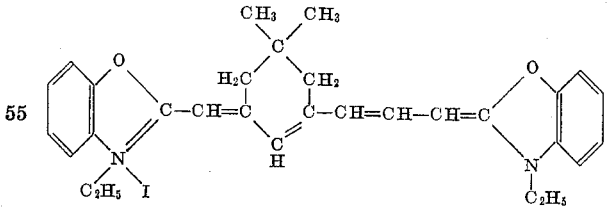

3 - ethyl - 2 - (1,5,5 - trimethyl - 3 - cyclohexenylidene)methylbenzoxazolium iodide (0.41 g., 1 mol.), 2-β-acetanilidovinyl-3-ethylbenzoxazolium iodide (0.43 g., 1 mol.), and triethylamine (0.28 ml., 1 mol. + 100%) were dissolved in ethyl alcohol (10 ml.) and heated under reflux for ten minutes. The reaction mixture was chilled and the crude dye thrown out of solution by the addition with stirring of water (100 ml.) and ether (100 ml.). The water and ether solutions were decanted and the residue dissolved in methyl alcohol (10 ml.) and stirred with sodium iodide (2 g.). The crude crystalline dye was then filtered off and dried. After two recrystallizations from methyl alcohol, the yield of purified dye was 0.06 g. (10%). M. P. 193–5° C. dec.

As shown in British Patent 625,907, sensitizing dyes can be obtained by condensing a compound selected from those represented by Formula I above with a compound selected from those represented by the following general formula:

XIV.

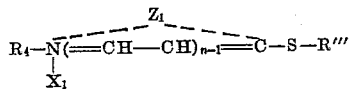

wherein $R_4$, $X_1$, $n$ and $Z$ each have the values given above, and $R'''$ represents an alkyl group, such as methyl, ethyl, etc., or an aryl group, such as phenyl, tolyl, etc. The following examples describe the preparation of similar carbocyanine dyes which contain a mesonaphthyl group. Such dyes are not contemplated by the British patent.

*Example 23.—3,3'-diethyl-9-(1-naphthyl)-thiacarbocyanine iodide*

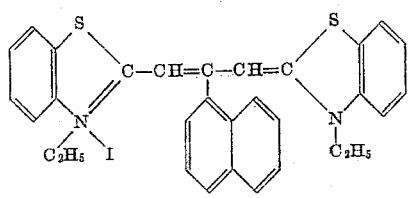

3 - ethyl - 2 - (2 - α - naphthylpropenyl)benzothiazolium iodide (1 mol., 0.76 g.), 3-ethyl-2-ethylmercaptobenzothiazolium ethosulfate (2 mols., 1.16 g.) and triethylamine (2 mols., 0.5 cc.) were dissolved in ethyl alcohol (10 ml.) and heated under reflux for fifteen minutes. The reaction mixture was then chilled overnight, filtered, and the crude dye washed with water and dried. After two recrystallizations from methyl alcohol, the yield of purified dye was 0.52 g. (51%), M. P. 287–288° C. dec.

*Anal.*—Calcd. for $C_{31}H_{27}IN_2S_2$: I, 20.52; Found: I, 20.5.

*Example 24.—3-ethyl-1'-methyl-9-(1-naphthyl)-thia-2'-carbocyanine iodide*

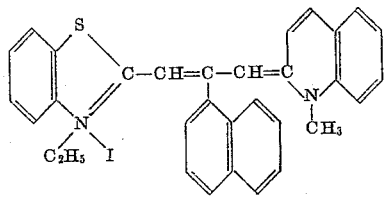

3 - ethyl - 2 - (2 - α - naphthylpropenyl)benzothiazolium iodide (1 mol., 0.76 g.), 1-methyl-2-phenylmercaptoquinolinium iodide (1 mol. + 10%, 0.70 g.) and triethylamine (1 mol. + 100%, 0.5 ml.) were dissolved in ethyl alcohol (10 ml.) and heated under reflux for fifteen minutes. The reaction mixture was chilled overnight, filtered, and the crude dye washed with water and ethyl alcohol and dried. After two recrystallizations from methyl alcohol, the yield of purified dye was 0.45 g. (45%), M. P. 246–247° C. dec.

*Anal.*—Calcd. for $C_{32}H_{27}IN_2S$: I, 21.20; Found: I, 21.1.

*Example 25.—1',3-diethyl-9-(1-naphthyl)-thia-4'-carbocyanine iodide*

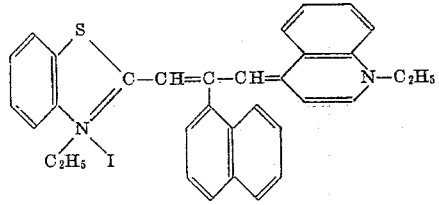

3 - ethyl - 2 - (2 - α - naphthylpropenyl)benzothiazolium iodide (1 mol., 0.76 g.), 1-ethyl-4-phenylmercaptoquinolinium-p-toluenesulfonate (1 mol. + 100%, 1.46 g.) and triethylamine (1 mol. + 100%, 0.5 cc.) were dissolved in ethyl alcohol (10 ml.) and heated under reflux for fifteen minutes. The reaction mixture was then chilled overnight, filtered, and the crude dye washed with water and dried. After two recrystallizations from methyl alcohol, the yield of purified dye was 0.50 g. (49%), M. P. 231–232° C. dec.

The new dyes of my invention are useful in spectrally sensitizing photographic silver halide emulsions when incorporated therein. The dyes are especially useful for extending the spectral sensitivity of the customarily employed gelatino silver chloride, gelatino silver chlorobromide, gelatino silver bromide, gelatino silver bromiodide, and gelatino silver chlorobromiodide developing-out emulsions. To prepare emulsions sensitized with one or more of my new dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Pyridine or acetone has proved satisfactory as a solvent for most of my new dyes. The dyes are advantageously incorporated in the finished, washed emulsions and should be uniformly distributed throughout the emulsions.

The concentration of the dyes in the emulsions can vary widely, e. g. from 5 to 100 mg. per liter of flowable emulsion. The concentration of the dyes will vary according to the type of emulsion and according to the effect desired. The suitable and most economical concentration for any given emulsion will be apparent to those skilled in the art, upon making the ordinary tests and observations customarily used in the art of emulsion making. To prepare a gelatino-silver halide emulsion sensitized with one or more of my new dyes, the following procedure is satisfactory:

A quantity of dye is dissolved in pyridine or acetone (or a mixture of acetone and pyridine) and a volume of this solution, which may be diluted with water, containing from 5 to 100 mg. of dye, is slowly added to about 1000 cc. of gelatino-silver halide emulsion, with stirring. Stirring is continued until the dye is thoroughly dispersed in the emulsion.

With most of my dyes, from 10 to 20 mg. of dye per liter of gelatino-silver bromide or bromiodide emulsion (containing about 40 g. of silver halide) suffices to produce the maximum sensitizing effect. With the finer grain emulsions, somewhat larger concentration of dye may be needed to produce the maximum sensitizing effect.

The above statements are only illustrative, as it will be apparent that the dyes can be incorporated in photographic emulsions by any of the other methods customarily employed in the art, e. g. by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

Photographic silver halide emulsions, such as those listed above, containing the sensitizing dyes of my invention can also contain such addenda as chemical sensitizers (e. g. sulfur sensitizers, such as allyl thiocarbamide, thiourea, allylisothiocyanate, cystine, etc.), various gold compounds, such as potassium chloroaurate, auric trichloride, etc. (see U. S. Patents 2,540,085; 2,597,856; and 2,597,915, for example), various palladium compounds (such as palladium chloride (U. S. 2,540,086), potassium chloropalladate (U. S. 2,598,079), etc.) etc., or mixtures of such sensitizers, antifoggants (e. g. benzotriazole, nitrobenzimidazole, 5-nitroindazole, etc., (see Mees—"The Theory of the Photographic Process," Macmillan pub., pg. 460), or mixtures thereof), hardeners (e. g. formaldehyde (U. S. 1,763,533), chrome alum (U. S. 1,763,533), glyoxal (Ger. 538,713), dibromacrolein (Br. 406,750), etc.), color couplers, (e. g. such as those described in U. S. Patent 2,423,730, Spence and Carroll U. S. application 771,380, filed August 29, 1947, now U. S. Patent No. 2,640,776, issued June 2, 1953, etc.), or mixtures of such addenda. Dispersing agents for color couplers, such as substantially water-insoluble, high boiling crystalloidal materials, such as those set forth in U. S. Patents 2,322,027 and 2,304,940, can also be employed in the above-described emulsions.

What I claim as my invention and desire secured by Letters Patent of the United States is:

1. A polymethine dye selected from the group consisting of those represented by the following general formulas:

(a)

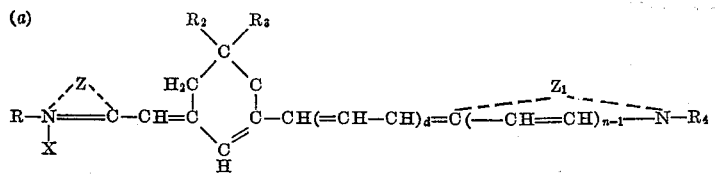

and (b)

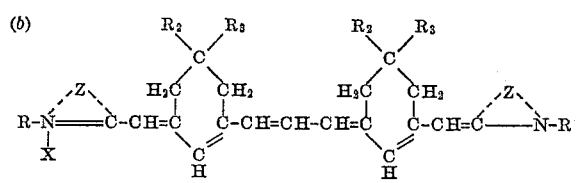

wherein R and R₄ each represent an alkyl group containing from 1 to 4 carbon atoms, R₂ represents a member selected from the group consisting of a hydrogen atom and a methyl group, R₃ represents a member selected from the group consisting of a hydrogen atom, an alkyl group containing from 1 to 4 carbon atoms, and a mononuclear aromatic group to the benzene series, X represents an acid radical, d represents a positive integer of from 1 to 3, Z represents the nonmetallic atoms necessary to complete a heterocyclic nucleus selected from the group consisting of those of the thiazole series, those of the benzothiazole series, those of the naphthothiazole series, those of the benzoxazole series, those of the napthoxazole series, those of the benzoselenazole series, those of the naphthoselenazole series, and those of the thiazoline series, Z₁ represents the nonmetallic atoms necessary to complete a heterocyclic nucleus containing from 5 to 6 atoms in the heterocyclic ring, n represents one when Z₁ represents the nonmetallic atoms necessary to complete a heterocyclic nucleus containing 5 atoms in the heterocyclic ring and n represents two when Z₁ represents the nonmetallic atoms necessary to complete a heterocyclic nucleus containing 6 atoms in the heterocyclic ring.

2. A polymethine dye selected from those represented by the following general formula:

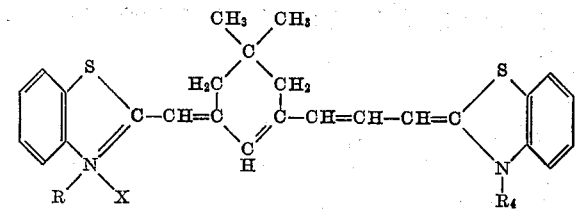

wherein R and R₄ each represents an alkyl group containing from 1 to 4 carbon atoms and X represents an acid radical.

3. A polymethine dye selected from those represented by the following general formula:

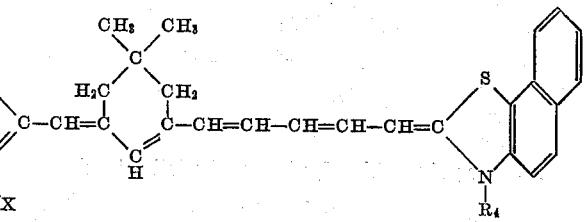

wherein R and R₄ each represents an alkyl group containing from 1 to 4 carbon atoms and X represents an acid radical.

4. A polymethine dye selected from those represented by the following general formula:

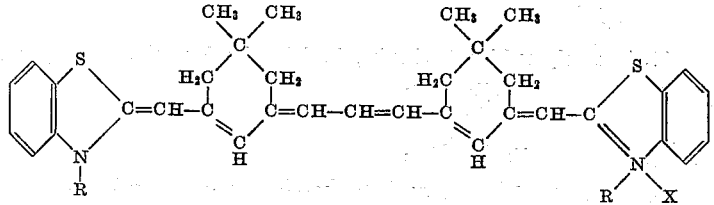

wherein R represents an alkyl group containing from 1 to 4 carbon atoms and X represents an acid radical.

5. A polymethine dye selected from those represented by the following general formula:

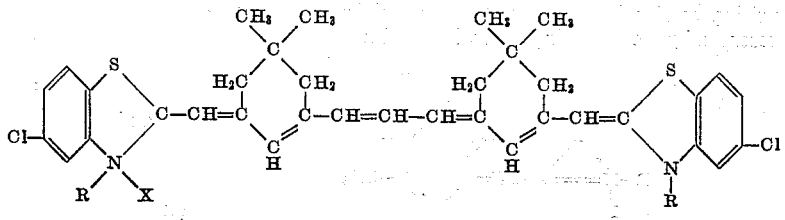

wherein R represents an alkyl group containing from 1 to 4 carbon atoms and X represents an acid radical.

6. A polymethine dye selected from those represented by the following general formula:

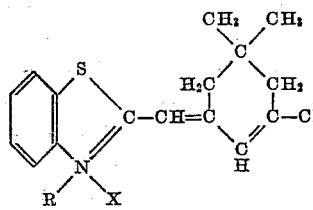

wherein R and R₄ each represents an alkyl group containing from 1 to 4 carbon atoms and X represents an acid radical.

7. The polymethine dye having the following formula:

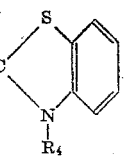

8. The polymethine dye having the following formula:

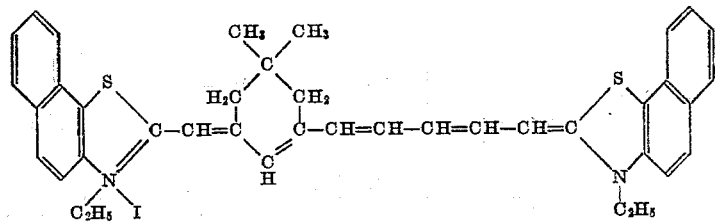

9. The polymethine dye having the following formula:

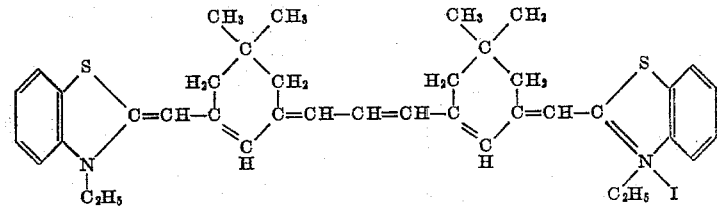

10. The polymethine dye having the following formula:

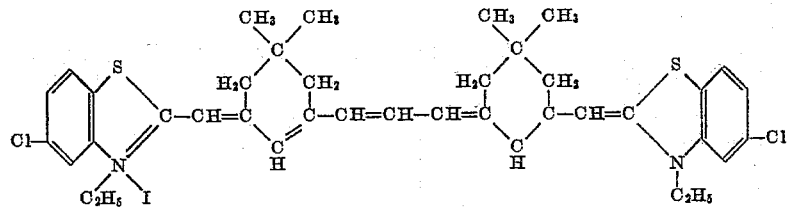

11. The polymethine dye having the following formula:

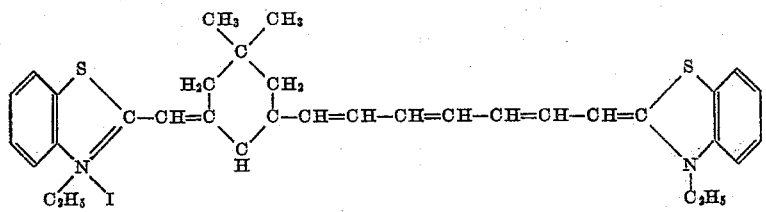

12. A process for preparing polymethine dyes comprising condensing a compound selected from those represented by the following general formula:

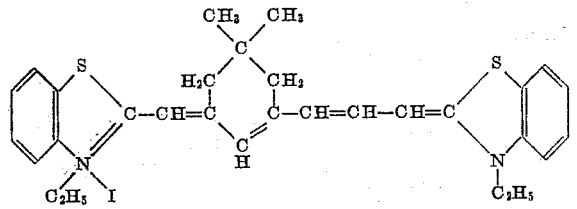

wherein R represents an alkyl group containing from 1 to 4 carbon atoms, $R_2$ represents a member selected from the group consisting of a hydrogen atom and a methyl group, $R_3$ represents a member selected from the group consisting of a hydrogen atom, an alkyl group containing from 1 to 4 carbon atoms, and a mononuclear aromatic group of the benzene series, X represents an acid radical, and Z represents the non-metallic atoms necessary to complete a heterocyclic nucleus selected from the group consisting of those of the thiazole series, those of the benzothiazole series, those of the naphthothiazole series, those of the benzoxazole series, those of the naphthoxazole series, those of the benzoselenazole series, those of the naphthoselenazole series and those of the thiazoline series, together with a compound selected from those represented by the following two general formulas:

(a)

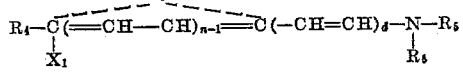

and (b)

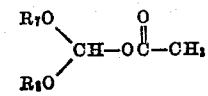

wherein $R_4$, $R_7$, and $R_8$ each represents a lower alkyl group, $R_5$ represents a carboxylic acyl group containing from 2 to 7 carbon atoms, $R_6$ represents a mononuclear aromatic group of the benzene series, $X_1$ represents an acid radical, $d$ represents a positive integer of from 1 to 3, $Z_1$ represents the nonmetallic atoms necessary to complete a heterocyclic nucleus containing from 5 to 6 atoms in the heterocyclic ring, and $n$ represents 1 when $Z_1$ represents the nonmetallic atoms necessary to complete a heterocyclic nucleus containing 5 atoms in the heterocyclic ring and $n$ represents 2 when $Z_1$ represents the nonmetallic atoms necessary to complete a heterocyclic nucleus containing 6 atoms in the heterocyclic ring.

13. A process as defined by claim 12 wherein a compound selected from those represented by Formula $a$ is employed, wherein the condensation is carried out in the presence of a trialkylamine.

14. A process as defined by claim 13 wherein triethylamine is the trialkylamine.

References Cited in the file of this patent

UNITED STATES PATENTS

| | | | |
|---|---|---|---|
| 2,126,078 | Zeh | Aug. 9, | 1938 |
| 2,153,928 | Kendall | Apr. 11, | 1939 |
| 2,481,464 | Anish | Sept. 6, | 1949 |
| 2,525,015 | Beersman | Oct. 10, | 1950 |
| 2,527,259 | Kendall | Oct. 24, | 1950 |
| 2,537,880 | Dent | Jan. 9, | 1951 |
| 2,542,401 | Doyle | Feb. 20, | 1951 |
| 2,557,806 | Straete | June 19, | 1951 |
| 2,647,116 | Vinton | July 28, | 1953 |

FOREIGN PATENTS

| | | |
|---|---|---|
| 595,784 | Great Britain | 1947 |
| 595,785 | Great Britain | 1947 |
| 625,907 | Great Britain | 1949 |